3,115,491
PROCESS FOR THE PREPARATION OF 11-SUBSTI-
TUTED 17α,21-DIHYDROXY - 16α - METHYL - 9α-
FLUORO-Δ¹,⁴-PREGNADIENE-3,20-DIONES
Georges Muller, Nogent-sur-Marne, France, assignor, by
mesne assignments, to Roussel-UCLAF, S.A., Paris,
France, a corporation of France
No Drawing. Filed Dec. 24, 1959, Ser. No. 861,783
4 Claims. (Cl. 260—239.55)

The present invention is directed to a novel process for the preparation of substituted cortico-steroids, namely of 11-substituted-17α,21-dihydroxy-9α-fluoro - 16α - methyl-Δ¹,⁴-pregnadiene-3,20-diones of the formula

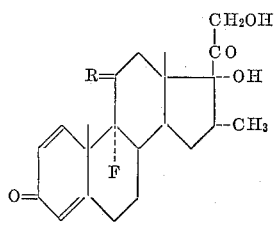

wherein

or =O.

These compounds, which have already been described in the literature, exhibit an extremely high cortisone activity, but their production requires a very complicated synthesis comprising about 30 stages, starting with initial materials such as bile acids or Mexican sapogenins. As is well-known, a reduction of the yields in one or several consecutive stages can cause a substantial drop in the overall yield when performing a large number of chemical synthesis steps. Moreover, it is of interest in industry to obtain, as intermediates, stable products which do not deteriorate in the course of the operations, as do the cortisone steroids which have a ketol function

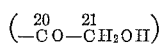

in their side chain.

The heretofore published processes (Arth et al., J. Am. Chem. Soc. 80, 316–61 (1958); Oliveto et al., ibid., p. 4428; Oliveto et al., ibid., p. 4431) introduce this ketol function at the beginning of the synthesis steps of transforming a 3-acyloxy-16α-methyl-pregnane or allopregnane-20-one into compounds similar to those of the Formula I in Table I. If the process is carried out in the prior-art sequence, the final products, the 16α-methyl isomer, are obtained by introducing the two double bonds of the A ring in two separate and distinct steps. The 4,5 double bond is formed by de-hydrobromination of the corresponding 4-bromo-pregnane-3-one. The double bond in the 1,2-position is formed separately by microbiological means or by dehydrogenation with selenium. The latter method does not produce quantitative yields and the selenium is difficult to eliminate. Moreover, if the process is carried out according to the prior art, it is necessary to form semicarbazones or ketals of the keto function in the 20-position of the intermediate product before the reduction of the keto function in the 11-position into the corresponding 11β-hydroxyl derivative. As Wendler et al., J. Am. Chem. Soc. 73, 3818 (1951), have shown, this formation of semicarbazones or ketals is often very difficult as a consequence of the steric hindrance in the 21-position if the alcohol in the 21-position is protected in the form of the acylated derivative. The reductions being effected in an alkaline medium, this acylated derivative is saponified in the course of the reduction and it then again becomes necessary to protect the hydroxyl group in the 21-position, which involves additional operation. In addition, as Belgian Patent No. 568,694, shows, the semicarbazones of the Δ¹,⁴-pregnadiene-3,20-diones are difficult to hydrolize unless special precautions are taken. Thus, Herzog et al., J. Am. Chem. Soc. 77, 4781–4 (1955), were able to transform the 3,20-disemicarbazone of prednisolone into prednisolone with a yield of only 5%.

Finally, the oxidation of the hydroxyl group in the 3-position of certain steroids is difficult to accomplish and requires the use of particular reactants, such as the chromic anhydride-pyridine complex.

An object of the present invention is the development of a process for the obtention of 11-substituted-17α,21-dihydroxy-9α-fluoro-16α-methyl - Δ¹,⁴ - pregnadiene - 3,20-diones in good yields and free from the defects of the prior art.

A further object of the invention is the production of 11-substituted-17α,21-dihydroxy-9α-fluoro - 16α - methyl-Δ¹,⁴-pregnadiene-3,20-diones from the known and readily available 3α,17α-dihydroxy-16α-methyl-pregnane - 11,20-dione in only twelve synthesis steps.

A still further object of the invention is obtention of the novel intermediates of the synthesis.

a. Pure 3α,17α-dihydroxy-16α-methyl-pregnane-11,20-dione having a melting point of 190° C.
b. 17α-hydroxy-16α-methyl-pregnane-3,11,20-trione.
c. 17α-hydroxy-16α-methyl-2,4-dibromo-pregnane - 3,11,20-trione.
d. 17α-hydroxy-16α-methyl-Δ¹,⁴-pregnadiene - 3,11,20-trione.
e. The 3,20-disemicarbazone of 17α-hydroxy-16α-methyl-Δ¹,⁴-pregnadiene-3,11,20-trione.
f. The 3,20-disemicarbazone of 11β,17α-dihydroxy-16α-methyl-Δ¹,⁴-pregnadiene-3,20-dione.
g. 11β,17α-dihydroxy-16α-methyl-Δ¹,⁴-pregnadiene - 3,20-dione.
h. 17α-hydroxy-16α-methyl-Δ¹,⁴,⁹-pregnatriene-3,20-dione.
i. 11β,17α-dihydroxy-16α-methyl-9α-bromo-Δ¹,⁴-pregnadiene-3,20-dione.
j. 17α-hydroxy-16α-methyl-9β,11β-epoxy - Δ¹,⁴ - pregnadiene-3,20-dione.
k. 11β,17α-dihydroxy-16α-methyl-9α-fluoro-Δ¹,⁴-pregnadiene-3,20-dione.
l. 17α-hydroxy-16α-methyl-9α-fluoro-Δ¹,⁴-pregnadiene - 3, 11,20-trione.

These and other objects of the invention will become more apparent as the description of the invention proceeds.

I have found that by the process according to the present invention all the prior art disadvantages are avoided. By the invention the simultaneous introduction of the two double bonds into the A ring is performed along with easy formation of the semicarbazone in the 20-position, easy hydrolysis of a diene-disemicarbazone and easy oxidation of the hydroxyl group in the 3-position into a ketone group. As shown by the schematic reaction flow sheet of Table I, the present process is, moreover, distinguished over the known processes by the fact that the last step of the synthesis is the formation of the hydroxyl group in the 21-position, whereas the known processes terminate the synthesis by either the step of formation of the double bond in the 1,2-position or the step of introduction of the fluorine in the 9α-position.

In order to obtain the compounds of the Formula A by the process according to the invention, 3α,17α-dihydroxy-16α-methyl-pregnane-11,20-dione (I) is used as the starting material. This compound I is readily accessible through a series of operations well known in the steroid chemistry, thanks to the work Marker, J. Am. Chem. Soc., 64, 1280 (1942), and Gallagher, J. Am.

Chem. Soc. 72, 882 (1950). According to these authors, methylmagnesium iodide is reacted with a 3α-acetoxy-Δ16-pregnene-20-one. The 3α-acetoxy-16α-methyl-pregnane-20-one obtained is hydroxylated in the 17 position by passage through the 17,20-epoxide intermediate. Saponification of the latter compound leads to compound I as shown in the reaction flow sheet of Table I, if the product with which the methylmagnesium iodide is reacted is 3α-acetoxy-Δ16-pregnene-11,20-dione.

TABLE I

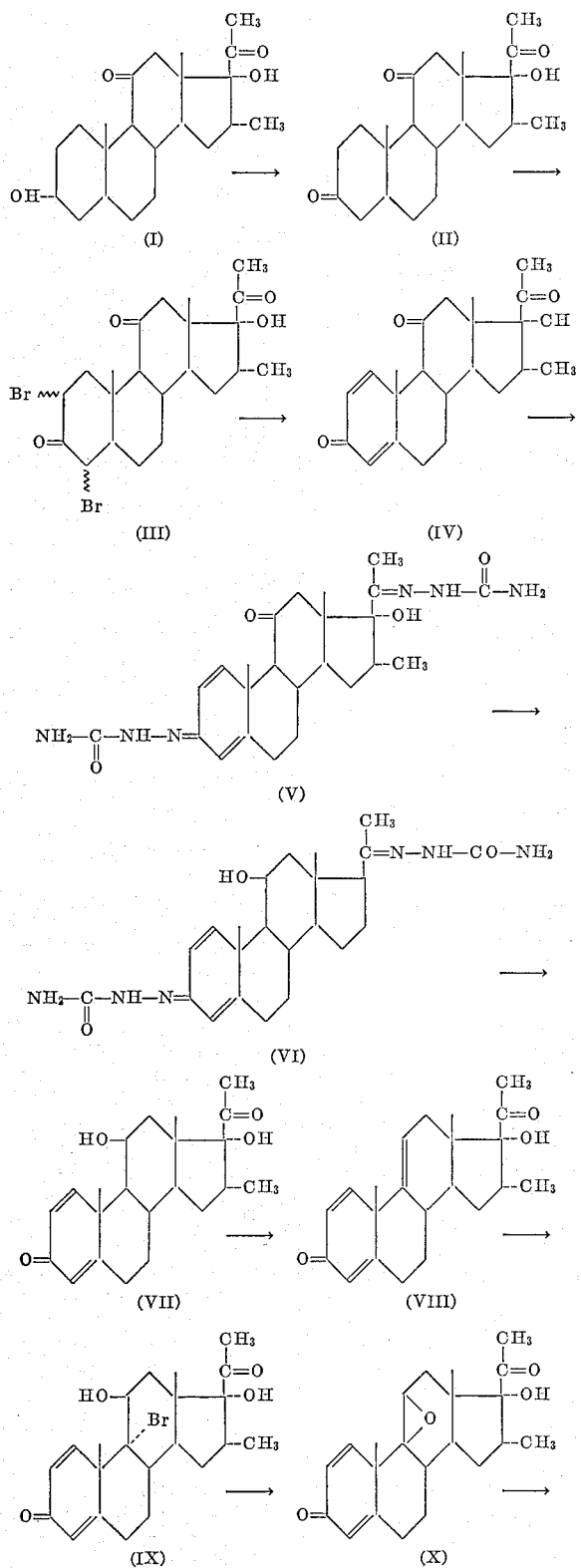

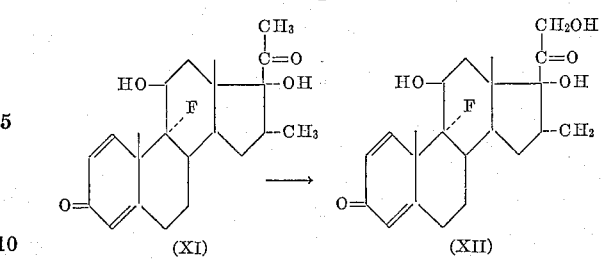

According to the outlined flow diagram of Table I, the process of the invention is in the following steps.

The 3α,17α-dihydroxy-16α-methyl-pregnane-11,20-dione (I) is oxidized by the action of acidic chromic acid in an aqueous inert organic solvent in the cold, such as aqueous sulfochromic acid in acetone at temperatures below +10° and 17α-hydroxy-16α-methyl pregnane-3,11,20-trione (II) is formed. By reacting compound II with bromine in an inert organic solvent such dioxane or ethylacetate under acidic conditions in the cold, the corresponding 17α-hydroxy-16α-methyl-2,4-dibromo-pregnane-3,11,20-trione (III) is obtained with excellent yields. Compound III is dehydrobrominated by the action of a lithium halide-lithium carbonate mixture in a refluxing inert organic solvent. Preferably lithium bromide-lithium carbonate in a weight ratio of 1:2 dissolved in dimethylformamide is used. 17α-hydroxy-16α-methyl-Δ1,4-pregnadiene-3,11,20-trione (IV) is obtained which, not being sterically hindered in the 21-position, may readily be trans- inert organic solvent. Preferably lithium bromide-lithium by reacting with a semicarbazide salt under acidic conditions. By reduction with alkali metal boronhydrides in an inert organic solvent, the ketone function in the 11-position of compound V is reduced into a secondary alcohol group the hydroxyl radical of which is β-oriented to give the 3,20-disemicarbazone of 11β,17α-dihydroxy 16α-methyl-Δ1,4-pregnadiene-3,20-dione (VI). The 11β, 17α - dihydroxy-16α-methyl-Δ1,4-pregnadiene-3,20 - dione (VII) is liberated from the disemicarbazone by pyruvic acid hydrolysis. This compound VII is transformed into 17α-hydroxy-16α-methyl-Δ1,4,9-pregnatriene - 3,20 - dione (VIII) by the action of a dehydrating agent, preferably an acid chloride, either organic or mineral such as thionylchloride in an inert organic solvent in the cold, either by converting compound VII to an 11-ester derivative such as the 11-methanesulfonate or by direct dehydrating of the 11-hydroxyl compound VII. By reaction with an N-bromo imide such as N-bromosuccinimide in the presence of a peracid such as perchloric acid, the triene VIII yields the bromohydrin 11β,17α-dihydroxy-16α-methyl-9α-bromo-Δ1,4-pregnadiene-3,20-dione (IX). This compound IX is transformed into the 9β,11β-epoxide (X) by the action of alkalies, preferably alcoholic alkali metal hydroxides such as methanolic potassium hydroxide. The 17α-hydroxy-16α-methyl-9β,11β-epoxy-Δ1,4 - pregnadiene-3,20-dione (X) is treated with anhydrous hydrofluoric acid in a neutral organic solvent to yield the fluorohydrin 11β,17α-dihydroxy-16α-methyl-9α - fluoro - Δ1,4 - pregnadiene-3,20-dione (XI). This last compound is subjected to biological hydroxylation in accordance with the process described in U.S. Patent 2,805,978 by the action of diastases secreted by *Colletotrichum lindemuthianum* (ATCC 12611) and yields compound

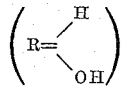

11β,17α-21-trihydroxy-16α-methyl-9α-fluoro-Δ1,4 - pregnadiene-3,20-dione (XII). In order to arrive at compound A (R=O), compound XI is oxidized by methods customarily used in steroid chemistry, for example by the action of chromic acid anhydride or N-bromo amides such as N-bromoacetamide, and then biologically hydroxylated in the 21-position as described above.

It will be understood that the performance of the process described in the examples is merely a preferred mode of operation. Without departing from the scope of the present invention, it is possible to vary the nature of the solvents or the oxidation, reduction or acetylation agents employed, provided the order of succession of the operations disclosed herein is preserved.

The following examples are presented for illustration of the invention only without, however, limiting it in any manner.

EXAMPLE I

*Preparation of 11β,17α,21-trihydroxy-16α-methyl-9α-fluoro-Δ$^{1,4}$-pregnadiene-3,20-dione*

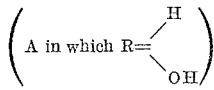

*Stage I—Preparation of 3α,17α-dihydroxy-16α-methyl-pregnane-11,20-dione (I).*—76 gm. of raw compound I, described by Arth et al., J. M. Chem Soc. 80, 3160 (1958), having a melting point of 185 to 187° C. and an optical rotation $[\alpha]_D^{20}=+60°$ (in chloroform) and consisting of a mixture of equal parts of compound I and 3α-hydroxy-16α-methyl pregnane-11,20-dione, are twice recrystallized from dichloromethane. Compound I solvated with 20%-dichloromethane is thus obtained. After desolvation by heating in vacuo at about 100° C., pure 3α,17α-dihydroxy-16α-methyl-pregnane-11,20-dione was obtained having a melting point of 190° C. and an optical rotation $[\alpha]_D^{20}=+25°\pm5$ (c.=0.5% in chloroform). The compound is soluble in acetone, chloroform and dichloromethane, very slightly soluble in ether, and insoluble in water, dilute acids and dilute alkalies.

Analysis: $C_{22}H_{34}O_4=362.49$ (mol. wt.). Calculated: C, 72.89%; H, 9.45%; O, 17.66%. Found: C, 72.8%; H, 9.5%; O, 17.8%.

This compound is not described in the literature.

*Stage II.—Preparation of 17α-hydroxy-16α-methyl-pregnane-3,11,20-trione (II).*—30 gm. of pure compound I obtained according to the preceding stage are dissolved in 360 cc. of acetone by boiling under reflux. The solution is cooled to 0° C. and approximately 47 cc. of a solution of sulfochromic acid, obtained by dissolving 25 gm. of chromic acid anhydride in a mixture of 37 gm. of concentrated sulfuric acid and 100 cc. of water, are added over a period of ½ hour, accompanied by thorough agitation. During the course of the oxidation the temperature is maintained at +5° C. or less. The mixture is stirred for a few additional minutes, poured into 2 liters of water and iced for ¼ hour. The trione II precipitated thereby is separated on a vacuum filter, washed with water, again subjected to vacuum filtration and purified by recrystallization from boiling methanol. 26.6 gm. of 17α-hydroxy-16α-methyl-pregnane-3,11,20-trione (II), that is a yield of 88% of theory, are obtained. It has a melting point of 204 to 205° C. and an optical rotation of $$[\alpha]_D^{20}=+35°\pm3°$$

(c.=0.5% in chloroform) and is sufficiently pure for use in the subsequent operations. The mother liquor yields an additional 6% of product II. Trione II is soluble in acetone and chloroform, slightly soluble in methanol and ether and insoluble in water.

For purposes of analysis, the raw compound is recrystallized from methanol, whereupon it has a melting point of 205° C.

Analysis: $C_{22}H_{32}O_4$; mol. wt.=360.48. Calculated: C, 73.30%; H, 8.95%. Found: C, 73.2%; H, 9.0%.

This product is not described in the literature.

*Stage III.—Preparation of 17α-hydroxy-16α-methyl-2,4-dibromo-pregnane-3,11,20-trione (III).*—24 gm. of the trione (II) prepared according to the preceding stage are dissolved in 700 cc. of ethyl acetate by boiling. The solution is cooled to 0° C. and 1 cc. of acetic acid containing 30% hydrobromic acid is added. Thereafter, while maintaining the temperature between —2° and 0° C., 145 cc. of acetic acid containing 16% bromine are added over a period of a few minutes, the mixture is allowed to stand for 2 to 3 minutes at 0° C. and is then poured into ice water. The solution is decolorized by addition of a few drops of a sodium bisulfite solution, thereafter, the solution of the dibromo-trione III in ethyl acetate is washed with water and then with a dilute solution of sodium bicarbonate until it has a pH of 7, dried over magnesium sulfate, filtered and the organic extract is evaporated to dryness in vacuo. The residue crystallizes upon addition of ether and scratching. After filtration on a vacuum filter and drying of the filter cake 31.7 gm., that is a yield of 91% of theory, of the 17α-hydroxy-16α-methyl-2,4-dibromo-pregnane-3,11,20-trione (III) are obtained. It has an optical rotation $[\alpha]_D^{20}=-30°\pm7°$ (c.=0.5% in chloroform). The product melts with decomposition at about 200° C. It is soluble in acetone and chloroform, very slightly soluble in ether and insoluble in water.

Analysis: $C_{22}H_{30}O_4Br_2$; mol. wt.=518.3. Calculated: Br, 30.8% (29.7% with 1 mol. water). Found: Br, 29.8%.

This compound is not described in the literature.

*Stage IV.—Preparation of 17α-hydroxy-16α-methyl-Δ$^{1,4}$-pregnadiene-3,11,20-trione (IV).*—A mixture of 24.5 gm. of lithium bromide, 49 gm. of lithium carbonate and 150 cc. of dimethylformamide is heated to reflux, accompanied by mechanical agitation. Approximately 10 cc. of the liquid are distilled off and, without interrupting the reflux, 49 gm. of the dibromo trione III produced according to the preceding stage dissolved at room temperature in 110 cc. of dimethylformamide, are added very rapidly within a period of 2 to 3 minutes. Dimethylformamide is distilled off for about 10 minutes, the contents of the flask are cooled to about 40 to 50° C. and poured into ice water containing about 100 cc. of acetic acid. The mixture is filtered on a vacuum filter, the filter cake is washed with water and then with 250 cc. of dichloromethane. The aqueous phase is separated by decanting and re-extracted with dichloromethane. The organic extracts are combined, dried over magnesium sulfate, filtered and concentrated to about 50 cc. 300 cc. of ether are added, the solution is concentrated to 100 cc., iced, vacuum filtered, and the filter cake is washed with ether and dried. 28.5 gm., which is a yield of 84% of theory, of the unsaturated 17α-hydroxy-16αmethyl-Δ$^{1,4}$-pregnadiene-3,11,20-trione (IV) are obtained. It has a melting point of 234° C. and an optical rotation $[\alpha]_D^{20}=+140°\pm5°$ (c.=0.5% in chloroform). The product is soluble in acetone and chloroform, very slightly soluble in ether and insoluble in water and dilute aqueous alkalies.

Analysis: $C_{22}H_{28}O_4+\frac{1}{4}H_2O$; mol wt. 356.44+4.5. Calculated: C, 73.2%; H, 7.96%; O, 18.84%. Found: C, 73.0%; H, 7.8%; O, 18.7%.

This compound is not described in the literature.

*Stage V—Preparation of the 3,20-disemicarbazone of 17α-hydroxy-16α-methyl-Δ$^{1,4}$-pregnadiene-3,11,20-trione (V).*—29 gm. of the unsaturated trione IV prepared according to the preceding stage are mechanically agitated under a stream of nitrogen with 34.8 gm. of semicarbazide hydrochloride and 348 cc. of acetic acid, and then about 69.5 gm. of disodium phosphate in powder form are slowly introduced over a period of ¼ hour. A slight amount of heat is evolved and the mixture is maintained for 16 hours at 50° C. without interrupting either the agitation or the stream of nitrogen. Thereafter, the mixture is cooled to +10° C., 1 liter of water and 1 kg. of ice are added, and after cooling this mixture externally, it is neutralized with ammonia until alkaline. The 3,20-disemicarbazone of 17α-hydroxy-16α-methyl-Δ$^{1,4}$-pregnadiene-3,11,20-trione (V) formed by the reaction is separated by vacuum filtration, and thereafter, the filter cake is washed first with water on the filter and then by trituration and the mixture is again filtered on a vacuum filter.

The moist product, weighing 124 gm., issued is used as such for the subsequent reduction.

*Stage VI—Preparation of 3,20-disemicarbazone of 11β, 17α-dihydroxy-16α-methyl - Δ$^{1,4}$ - pregnadiene-3,20-dione (VI).*—The 124 gm. of the moist disemicarbazone V obtained according to the preceding stage are dissolved in 390 cc. of tetrahydrofuran at room temperature. 305 cc. of water are added, the mixture is heated to 60° C. and, while mechanically agitating, a thin stream of a solution of 13 gm. of potassium borohydride in 78 cc. of water and 13 cc. of 1 N aqueous sodium hydroxide is added. After maintaining the reaction mixture at 60° C. for 3 hours, the solvent is distilled off in vacuo until a foam forms, 300 cc. of ice water are added and the mixture is filtered. The filter cake is washed with water until neutral and excess moisture is removed by vacuum filtration. The moist 3,20-disemicarbazone of 11β,17α-dihydroxy-16α-methyl-Δ$^{1,4}$-pregnadiene-3,20-dione (VI), weighing 68 gm., may be used directly for the subsequent hydrolysis.

*Stage VII—Preparation of 11β,17α - dihydroxy - 16α-methyl-Δ$^{1,4}$-pregnadiene-3,20-dione (VII).*—The 68 gm. of moist disemicarbazone VI obtained according to the preceding stage, 47 cc. of pyruvic acid and 41 cc. of water are heated for 30 minutes at 30° C., accompanied by thorough agitation. Dissolution takes place. The reaction mixture is heated for 1 hour at 60° C. and then the temperature is increased at the rate of 5° C. every half hour while diluting the reaction mixture by adding 60 to 100 cc. of water. When the mixture has finally been heated for ½ hour at 75° C. it is poured into cold water, iced, filtered on a vacuum filter and the diene compound VII is washed with an aqueous dilute solution of sodium bicarbonate and then with water. Excess moisture is removed by vacuum filtration. The raw compound VII is taken up in 100 cc. of hot acetone, the solution is cooled and 200 cc. of dichloromethane are added. The organic phase is washed with an aqueous solution of sodium bicarbonate and then with water, dried over magnesium sulfate, filtered and passed through charcoal. Thereafter, the organic extract is evaporated to dryness, triturated with ethyl acetate, vacuum filtered and dried. 16 gm. of 11β,17α-dihydroxy-16α-methyl - Δ$^{1,4}$ - pregnadiene-3,20-dione (VII) which is a yield of 54% of theory, are thus obtained. It has a melting point of 220° C. The product is sufficiently pure for use in the subsequent operations. The pyruvic acid mother liquor is extracted with dichloromethane and the resin obtained thereby is combined with the liquid mixture of the first step. This amorphous material is then again subjected to the pyruvic acid treatment according to stage VII. The final yield then becomes 75% of theory.

For analysis, compound VII is recrystallized from dichloromethane, whereupon it has a melting point of 224° C. and an optical rotation $[\alpha]_D^{20}=+36°$ (c.=0.5% in chloroform). It is soluble in acetone, chloroform, and 10 to 15 volumes of dichloromethane at 40° C. It is almost insoluble in ethyl acetate and insoluble in ether.

Analysis: $C_{22}H_{30}O_4$; mol. wt. 358.46. Calculated: C, 73.71%; H, 8.44%. Found: C, 73.9%; H, 8.3%.

This compound is not described in the literature.

*Stage VIII—Preparation of 17α-hydroxy-16α-methyl-Δ$^{1,4,9}$-pregnatriene-3,20-dione (VIII).*—10 gm. of the dihydroxylated compound VII obtained according to the preceding stage are dissolved in a mixture consisting of 100 cc. of dimethyl formamide and 12 cc. of pyridine. The solution is cooled to −12° C., a mixture of 10 cc. of methane sulfonylchloride and 0.2 cc. of thionyl chloride is added, the temperature of the reaction mixture is allowed to rise to −5° C. at which it is maintained for ½ hour. Thereafter, the reaction mixture is heated to +20° C., maintained at this temperature for 1 hour, again cooled to −5° C. and 500 cc. of ice water are added in such a manner that the temperature does not rise above 0° C. The triene VIII formed thereby is separated by vacuum filtration, washed with water, triturated in 30 cc. of methanol, vacuum filtered, washed with methanol, vacuum filtered and dried. 8.6 gm. of 17α-hydroxy-16α-methyl-Δ$^{1,4,9}$-pregnatriene-3,20-dione (VIII) representing a yield of 89% of theory, are obtained. The product has a melting point of 222° C. and is sufficiently pure for use in the subsequent operations. For analysis, the product is recrystallized by dissolving it in dichloromethane and adding ether to the solution to crystalize. The pure product VIII has a melting point of 224° C., an optical rotation $[\alpha]_D^{20}=-28°±5°$ (c.=0.5% in chloroform), is soluble in acetone, chloroform and dichloromethane and very slightly soluble in ether.

Analysis: $C_{22}H_{28}O_3$; mol. wt.=340.44. Calculated: C, 77.61%; H, 8.29%. Found: C, 77.5%; H, 8.3%.

This compound is not described in the literature.

*Stage IX—Preparation of 11β,17α-dihydroxy - 16α-methyl-9α-bromo-Δ$^{1,4}$-pregnadiene - 3,20 - dione (IX).*—9.3 gm. of the triene VIII having a melting point of 222° C., obtained according to the process described in stage VIII, are added to 185 cc. of dioxan and 37 cc. of a 10% solution of perchloric acid. The mixture is cooled to +5° C., 5.1 gm. of N-bromosuccinimide are added and the mixture is mechanically agitated for 45 minutes at 18° C. Thereafter, 185 cc. of water are added, the mixture is subjected to vacuum filtration and the bromohydrin 11β,17α-dihydroxy-16α-methyl - 9α - bromo - Δ$^{1,4}$-pregnadiene-3,20-dione (IX) formed thereby is washed with water. The moist product which remains on the filter is utilized as such in the following stage.

*Stage X—Preparation of 17α-hydroxy-16α-methyl-9β, 11β-epoxy-Δ$^{1,4}$-pregnadiene-3,20-dione (X).*—The moist bromhydrin IX, obtained from 9.3 gm. of the triene in the preceding stage, is suspended in 93 cc. of methanol. The suspension is cooled to +10° C., 47 cc. of a 1 N alcoholic potassium hydroxide solution are added and the mixture is agitated for 40 minutes at 20 to 25° C. As the reaction gradually progresses the characteristic crystalline form of the epoxide X may be seen, when viewed under a microscope, to substitute itself for the less well defined form of the bromhydrin. 140 cc. of water are added, the epoxide X is separated on a vacuum filter, washed with water and then with methanol and dried. 7.7 gm. (79% of theory) of the epoxide 17α-hydroxy-16α-methyl-9β,11β-epoxy-Δ$^{1,4}$-pregnadiene - 3,20-dione (X) are thus obtained. It has a melting point of 252° C. and is sufficiently pure for use in the subsequent operations. For analysis, it is recrystallized from acetone, whereupon it has a melting point of 253° C. and an optical rotation $[\alpha]_D^{20}=-24°$ (c.=0.5% in chloroform). It is soluble in chloroform, slightly soluble in acetone, very slightly soluble in alcohol and insoluble in water.

Analysis: $C_{22}H_{28}O_4$; mol. wt. =356.44. Calculated: C, 74.13%; H, 7.92%. Found: C, 74.4%; H, 7.9%.

This compound is not described in the literature.

*Stage XI—Preparation of 11β,17α - dihydroxy - 16α-methyl-9α-fluoro-Δ$^{1,4}$-pregnadiene-3,20-dione (XI).*—1.2 gm. of the epoxide X, prepared according to the preceding stage, are dissolved in 25 cc. of chloroform. The solution is cooled to −12° C., 0.6 cc. of anhydrous hydrofluoric acid is added, the mixture is cooled to −70° C. and agitated mechanically for 20 minutes at a temperature less than or equal to −10° C. The reaction mixture assumes a violet color and divides into 2 layers. It is poured into 50 cc. of an iced aqueous solution of sodium bicarbonate. The chloroform layer is decanted and then an abundant crystallization of the fluorohydrin XI begins. The mixture is extracted several times with ethyl acetate containing 20% acetone. The organic extracts are washed with water, dried over magnesium sulfate, filtered and evaporated to dryness. The residue is triturated with dichloromethane and subjected to vacuum filtration. 655 mgm. of the fluorohydrin 11β,17α-dihydroxy-16α-methyl-9α-fluoro-Δ$^{1,4}$ - pregnadiene - 3,20-dione (XI), are thus obtained. It has a melting point of 285° C. and is ready to be biologically hydroxylated in the 21-position. Upon recrystallization from a mixture of acetone and ether the melting point does not change. The optical rotation is $[\alpha]_D^{20} = +73° \pm 10°$ (c.=0.25% in acetone). Product XI is very slightly soluble in chloroform and dichloromethane, slightly soluble in acetone, almost insoluble in ether and insoluble in water.

*Analysis:* $C_{22}H_{29}O_4F$; mol. wt.=376.45. Calculated: C, 70.18%; H, 7.76%; F, 5.05. Found: C, 70.1%; H, 7.9%; F, 4.8%.

This compound is not described in the literature.

*Stage XII—Preparation of 11β,17α,21-trihydroxy-16α-methyl-9α-fluoro-Δ¹,⁴-pregnadiene-3,20-dione (XII).*—Colletotrichum lindemuthianum (ATCC 12611) is cultured for 10 days at 24° C. in anagar medium of 2% saccharose and 20% potato decoction. The conidium is harvested in distilled water. The suspension thus obtained is used for sterile seeding of a 1 liter Erlenmeyer flask containing 100 cc. of a medium composed of the following:

| | Gm. |
|---|---|
| Pure glucose | 10 |
| Malt extract | 5 |
| Soya flour | 10 |
| Sodium chloride | 5 |
| Dry corn steep | 5 |
| Calcium carbonate | 1 |
| Tap water enough to make 1000 cc. | |

The pH of this medium had previously been adjusted to between 6.8 and 7.0 with potassium hydrovide and the medium was sterilized by heating for 30 minutes at a temperature of 120° C. After 5 days of cultivation at 24° C. on a shaker apparatus (85 strokes per minute, amplitude 8 cm.), 10 cc. of a 1% solution of compound XI, prepared as indicated in the preceding stage, in acetone is added to 1000 cc. of culture. Incubation for another 24 hours yielded the desired 21-trihydroxylated derivative with a yield of 50 to 60%, as indicated by paper chromatography determination. The isolation of the product was carried out in the following manner with 50 cc. of culture stock. The stock is filtered and the mycelium is washed twice with 5 cc. of acetone which is added to the filtrate. The mycelium is then extracted twice with 50 cc. portions of chloroform and the preceding filtrate is extracted with these 100 cc. of chloroform and then twice more with 20 cc. of portions of chloroform each. The combined chloroform extracts are first washed with an aqueous solution of sodium bicarbonate and then with water, dried over magnesium sulfate and evaporated to dryness in vacuo. The residue is taken up in 1 cc. of methanol and is used for the paper chromatography. Before the chromatography, the sheet of paper is immersed in a 30% solution of propylene glycol. After the paper is allowed to drip-dry, the chromatography is effected by using toluene saturated with propylene glycol for the steroid and allowing 8 to 15 hours for development. The spots are made to appear by the color reaction of Mader and Buck (Anal. Chem. 1952, 24, 666) with triphenyltetrazolium chloride which produces a red coloration on a white backround for the steroids containing the ketol function R—CO—CH₂OH. By comparative tests it is found that the ratio of transformation of the starting product XI into the ketol XII reaches 50 to 60%.

Another procedure in which the chloroform extract obtained after fermentation is evaporated to dryness and subjected to chromatography on alumina, makes it possible to isolate the ketol 11β-17α,21-trihydroxy-16α-methyl-9α-fluoro-Δ¹,⁴-pregnadiene-3,20-dione (XII), which is identical in all respects with the product described by Sarett et al. (J. Am. Chem. Soc. 80, 3160 (1958)).

EXAMPLE II

*Preparation of 17α,21-Dihydroxy-16α-Methyl-9α-Fluoro-Δ¹,⁴-Pregnadiene-3,11,20-Trione*

(A in which R=O)

*Stage A.—Preparation of 17α-hydroxy-16α-methyl-9α-fluoro-Δ¹,⁴-pregnadiene-3,11,20-trione.*—4 cc. of acetic acid are added to 170 mgm. of 16α-methyl-9α-fluoro-Δ¹,⁴-pregnadiene-11β,17α-diol-3,20-dione (XI) prepared according to Example I, stage XI, the mixture is heated to dissolve the solid and then cooled again to 16° C. 0.35 cc. of a 9.5% solution of chromic acid in acetic acid is added dropwise over a period of 10 minutes and the mixture is agitated at 20° C. for 30 minutes. Water is added to the mixture, which is then scratched, filtered on a vacuum filter, and the filter cake is washed with water and dried in a drying chamber. The yield is 140 mgm. that is 80% of theory, a raw 17α-hydroxy-16α-methyl-9α-fluoro-Δ¹,⁴-prenadiene-3,11,20-trione. By recrystallization from methanol, 80 mgm. of the compound having a melting point of 262 to 264° C. (decomposition) and an optical rotation $[\alpha]_D^{20} = +102° \pm 10°$ (c.=0.5% in acetone) are obtained. The infra red spectrum shows the presence of a single hydroxyl group and the characteristic curve is in agreement therewith.

Analysis: $C_{22}H_{27}O_4F$; mol. wt.=374.44. Calculated: C, 70.6%; H, 7.3%; F, 5.1%. Found: C, 71.0%; H, 7.2%; F, 5.1%.

This product is not described in the literature.

*Stage B.—Biological hydroxylation of 17α-hydroxy-16α-methyl-9α-fluoro-Δ¹,⁴-pregnadiene-3,11,20-trione.*—17α-hydroxy-16α-methyl-9α-fluoro-Δ¹,⁴-pregnadiene-3,11,20-trione, obtained in stage A above, is biologically hydroxylated as described in Example I, stage XII above. After fermentation of 100 mgm. of this product under the indicated conditions, extraction with chloroform and chromatography of this extract over alumina, 17α,21-hydroxy-16α-methyl-9α-fluoro-Δ¹,⁴-pregnadiene-3,11,21-trione (A, when R=O) is isolated and purified through the intermediate of its acetylated derivative which is prepared by acetylation with acetic anhydride in the presence of pyridine. The 21-acetate of compound XII thus obtained melts at 166° C. upon recrystallization from a mixture of dichloromethane and isopropyl ether.

It will be understood that the invention is not limited to the process exemplified in the preceding examples nor in the products thus obtained. More particularly, the nature of the solvents and reactants, as well as the reaction temperatures may be varied, as long as the order of the process steps is maintained, without departing from the spirit of the invention or the scope of the appended claims.

I claim:

1. The process for the preparation of 11-substituted 17α,21-dihydroxy-16α-methyl-9α-fluoro-Δ¹,⁴-pregnadiene-3,20-diones of the structural formula:

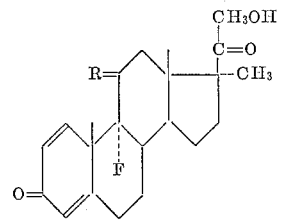

wherein R represents a radical selected from the group consisting of

and =O, which comprises the steps of;

a. Oxidizing pure 3α,17α-dihydroxy-16α-methyl-pregnane-11,20-dione by the action of acidic chromic acid in an aqueous inert organic solvent in the cold, b. brominating the 17α-hydroxy-16α-methyl-pregnane- 3,11,20-trione by the action of bromine in an inert organic solvent under acidic conditions in the cold, c. dehydrobrominating the 17α-hydroxy-16α-methyl-2,4-dibromo-pregnane-3,11,20-trione by the action of a lithium halide and lithium carbonate in a refluxing inert organic solvent, d. reacting the 17α-hydroxy-16α-methyl-$\Delta^{1,4}$-pregnadiene-3,11,20-trione with a semicarbazide salt under acidic conditions, e. reducing the 3,20-disemicarbazone of 17α-hydroxy-16α-methyl-$\Delta^{1,4}$-pregnadiene-3,11,20-trione by the action of an alkali metal borohydrin in an inert organic solvent, f. liberating the 11β,17α-dihydroxy-16α-methyl-$\Delta^{1,4}$-pregnadiene-3,20-dione by pyruvic acid hydrolysis, g. dehydrating the 11β,17α-dihydroxy-16α-methyl-$\Delta^{1,4}$-pregnadiene-3,20-dione by action of an acid chloride in an inert organic solvent in the cold, h. reacting the 17α-hydroxy-16α-methyl-$\Delta^{1,4,9}$-pregnatriene-3,20-dione with an N-bromo imide in the presence of a peracid, i. expoxidizing the 11β,17α-dihydroxy-16α-methyl-9α-bromo-$\Delta^{1,4}$-pregnadiene-3,20-dione by the action of alcoholic alkali metal hydroxides, j. reacting the 17α-hydroxy-16α-methyl-9β,11β-epoxy-$\Delta^{1,4}$-pregnadiene-3,20-dione with anhydrous hydrofluoric acid in a neutral organic solvent, k. oxidizing the 11β,17α-dihydroxy-16α-methyl-9α-fluoro-$\Delta^{1,4}$-pregnadiene-3,20-dione by action of an oxidizer selected from the group consisting of chromic acid anhydride and N-bromo amides, l. biologically oxidizing a steroid selected from the ground consisting of 11β,17α-dihydroxy-16α-methyl-9α-fluoro-$\Delta^{1,4}$-pregnadiene-3,20-dione of step j and 17α-hydroxy-16α-methyl-9α-fluoro-$\Delta^{1,4}$-pregnadiene-3,11,20-trione of step k by incubating with an active culture of *Colletotrichum lindemuthianum* and, m. separating said 11-substituted 17α,21-dihydroxy-16α-methyl-9α-fluoro-$\Delta^{1,4}$-pregnadiene-3,20-diones.

2. The 3,20-disemicarbazone of 17α-hydroxy-16α-methyl-$\Delta^{1,4}$-pregnadiene-3,11,20-trione.

3. The 3,20-disemicarbazone of 11β,17α-dihydroxy-16α-methyl-$\Delta^{1,4}$-pregnadiene-3,20-dione.

4. 17α-hydroxy-16α-methyl-9β,11β-epoxy-$\Delta^{1,4}$-pregnadiene-3,20-dione.

References Cited in the file of this patent

UNITED STATES PATENTS

| | | |
|---|---|---|
| 2,805,978 | Hagemann et al. | Sept. 10, 1957 |
| 2,819,264 | Gould et al. | Jan. 7, 1958 |
| 2,838,493 | Graber et al. | June 10, 1958 |
| 2,852,511 | Fried | Sept. 16, 1958 |
| 2,854,383 | Herzog | Sept. 30, 1958 |
| 2,880,218 | Hunt et al. | Mar. 31, 1959 |
| 2,888,473 | Joly et al. | May 26, 1959 |
| 2,902,410 | Weintrob et al. | Sept. 1, 1959 |
| 2,905,592 | Shull et al. | Sept. 22, 1959 |
| 2,912,446 | Sarett | Nov. 10, 1959 |
| 2,923,721 | Joly et al. | Feb. 2, 1960 |
| 2,970,155 | Joly et al. | Jan. 31, 1961 |
| 2,983,737 | Djerassi et al. | May 9, 1961 |

OTHER REFERENCES

Joly: Bull. Soc. Chim. 1958, pages 366–69.
Arth et al.: 80 J.A.C.S., 3160–62 (1958).

UNITED STATES PATENT OFFICE
CERTIFICATE OF CORRECTION

Patent No. 3,115,491                         December 24, 1963

Georges Muller

It is hereby certified that error appears in the above numbered patent requiring correction and that the said Letters Patent should read as corrected below.

Column 1, line 47, for "316-61" read -- 3160-61 --; column 3, lines 55 to 63, the right-hand portion of the formula should appear as shown below instead of as in the patent:

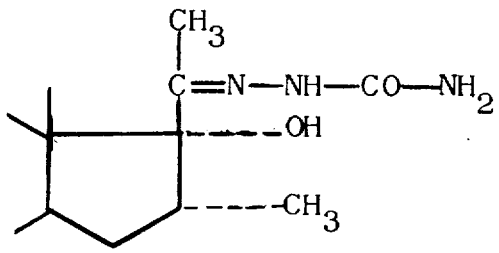

column 4, line 31, for "inert organic solvent. Preferably lithium bromide-lithium" read -- formed into the corresponding 3,20-disemicarbazone (V) --; line 64, after "compound" insert -- A --; column 10, lines 56 to 65, the right-hand portion of the formula should appear as shown below instead of as in the patent:

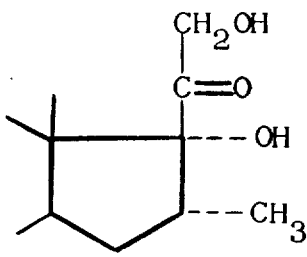

Signed and sealed this 14th day of July 1964.

(SEAL)
Attest:

ESTON G. JOHNSON                        EDWARD J. BRENNER
Attesting Officer                       Commissioner of Patents